(12) United States Patent
Shetty

(10) Patent No.: US 8,332,529 B1
(45) Date of Patent: Dec. 11, 2012

(54) MEDIA CONTENT INCLUDING INTRODUCED CODE

(75) Inventor: Pritham Shetty, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 376 days.

(21) Appl. No.: 12/475,115

(22) Filed: May 29, 2009

(51) Int. Cl.
*G06F 15/16* (2006.01)
*G06F 15/173* (2006.01)

(52) U.S. Cl. .......................... 709/231; 709/230; 709/238

(58) Field of Classification Search .................. 709/230, 709/231, 238
See application file for complete search history.

(56) References Cited

U.S. PATENT DOCUMENTS

| | | | |
|---|---|---|---|
| 6,938,047 B2 | 8/2005 | Kryeziu | |
| 6,988,278 B2* | 1/2006 | Gomez | 725/101 |
| 7,496,676 B2 | 2/2009 | Kryeziu | |
| 7,548,653 B2* | 6/2009 | Olshansky et al. | 382/232 |
| 8,009,962 B1* | 8/2011 | Herz | 386/248 |
| 8,195,035 B2* | 6/2012 | Bhogal et al. | 386/291 |
| 2001/0037485 A1* | 11/2001 | Zhang | 714/790 |
| 2002/0087994 A1* | 7/2002 | Gomez | 725/87 |
| 2004/0196410 A1* | 10/2004 | Johnson | 348/723 |
| 2005/0172122 A1* | 8/2005 | Risan et al. | 713/165 |
| 2006/0031914 A1* | 2/2006 | Dakss et al. | 725/135 |
| 2008/0209066 A1* | 8/2008 | Spio et al. | 709/231 |
| 2008/0235580 A1* | 9/2008 | Gonze et al. | 715/700 |
| 2008/0256431 A1* | 10/2008 | Hornberger | 715/202 |
| 2009/0049118 A1* | 2/2009 | Stevens | 709/203 |
| 2009/0136028 A1* | 5/2009 | Card, II | 380/200 |
| 2009/0154904 A1* | 6/2009 | Yahata et al. | 386/126 |

OTHER PUBLICATIONS

Adobe, Video File Format Specification, Version 10, 2008, Adobe Systems Incorporated, 48 pages.

* cited by examiner

*Primary Examiner* — Hieu Hoang
(74) *Attorney, Agent, or Firm* — Fish & Richardson P.C.

(57) ABSTRACT

Methods, systems, and apparatus, including computer programs encoded on a computer storage medium, for obtaining and performing programs in conjunction with media content rendering. In one aspect, a method includes obtaining media data and associated data, including time codes corresponding to both the media data and the associated data, the media data including at least one of video data and audio data; introducing a program in the associated data, the program having an associated time code from the time codes; and providing the media data and the associated data, with the program introduced therein, to one or more media player programs for rendering of the media data to an output device in accordance with the time codes relative to a start time and for performing one or more instructions defined by the program in coordination with the rendering based on the associated time code for the program.

23 Claims, 5 Drawing Sheets

MEDIA CONTENT INCLUDING INTRODUCED CODE

BACKGROUND

This specification relates to programs executed in conjunction with media content rendering.

The Internet is widely used to distribute multimedia information, including video and audio data. Such information can be downloaded as a file, or streamed to a client computer, where a media player application can process and output the media content to a display device and one or more speakers. The media player application can be a program written for a particular operating system (OS) on a computer platform. Alternatively, the media player can be "plug-in" based software that runs inside another program, such as a runtime environment, on a computer platform. For example, a FLASH® multimedia player program can play streamable content by running in a FLASH® runtime or an AIR® runtime environment provided by Adobe Systems Incorporated of San Jose, Calif., and using the runtime to render the media content to appropriate output devices.

In addition, media content can include associated metadata that provides information about the content to be rendered. Examples of metadata include author, publication and licensing information. Moreover, metadata can also include references to pre-exiting functions implemented in the media player itself that perform certain actions, such as recording information about media viewing patterns, showing an advertisement to a current viewer of the media content being rendered, or sending information to another computer accessible over the Internet for aggregation and analysis of media viewing statistics.

SUMMARY

This specification describes technologies relating to programs that are obtained and performed in conjunction with media content rendering.

In general, one innovative aspect of the subject matter described in this specification can be embodied in methods that include the actions of obtaining media data and associated data, including time codes corresponding to both the media data and the associated data, the media data including at least one of video data and audio data; introducing a program in the associated data, the program having an associated time code from the time codes; and providing the media data and the associated data, with the program introduced therein, to one or more media player programs for rendering of the media data to an output device in accordance with the time codes relative to a start time and for performing one or more instructions defined by the program in coordination with the rendering based on the associated time code for the program. Other embodiments of this aspect include corresponding systems, apparatus, and computer programs, configured to perform the actions of the methods, encoded on computer storage devices.

These and other embodiments can each optionally include one or more of the following features. Obtaining the program can include identifying a reference included within the associated data and having the associated time code, the reference being to the program; and retrieving the program from a different computer network domain via a computer network connection. Obtaining the program can include identifying the program as included within the associated data and having the associated time code; and retrieving the program from the associated data; wherein receiving the media data and the associated data includes receiving a multi-media stream including the media data and the associated data, with the program embedded in the multi-media stream.

Performing the one or more instructions defined by the program can include communicating information indicating one or more actions taken by a user in connection with the media data being rendered. The receiving, the obtaining, the rendering and the performing can be done by a runtime environment in which a media player application operates, and the method operations can include receiving commands from the media player application, and sending events to the media player application, including an event that communicates a key to the media player application to support server side aggregation of the information communicated by the runtime environment with additional information communicated by the media player application.

Performing the one or more instructions defined by the program can include communicating metadata regarding the media data being rendered. The program can include a first program having a first associated time code, and the method operations can include obtaining a second program introduced by the associated data, the second program having a second associated time code from the time codes; obtaining a third program introduced by the associated data, the third program having a third associated time code from the time codes, and the first, second and third associated time codes each being different from each other; performing one or more instructions defined by the second program in coordination with the rendering based on the second associated time code for the second program; and performing one or more instructions defined by the third program in coordination with the rendering based on the third associated time code for the third program.

A system can include a user device, and one or more computers operable to interact with the device and to perform operations of the method. The one or more computers can include a server operable to interact with the device through a data communication network, and the device can be operable to interact with the server as a client. Moreover, the device can include a computing apparatus having a runtime environment in which a media player application operates.

Particular embodiments of the subject matter described in this specification can be implemented so as to realize one or more of the following advantages. In some embodiments, one or more actions can be automatically performed in relation to electronic media containing embedded commands for performing the actions or one or more embedded references to these actions, even though the media player and/or the runtime environment rendering the media may lack the logic to perform the action(s). In this manner, for example, additional functionalities may be included within electronic media without the need for modifying the media player or runtime environment to perform the functionalities. Examples of actions can include the tracking of user interaction with a media player during the rendering of electronic media, the display of one or more advertisements during the rendering of electronic media, or the inclusion of additional context regarding electronic media which is being rendered. In some implementations, one or more actions can be executed in synchronization with a particular portion (e.g., audio frame, video frame) of the electronic media being rendered.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

An electronic document (which for brevity will simply be referred to as a document) may, but need not, correspond to a file. A document may be stored in a portion of a file that holds other documents, in a single file dedicated to the document in question, or in multiple coordinated files.

Figure 1:
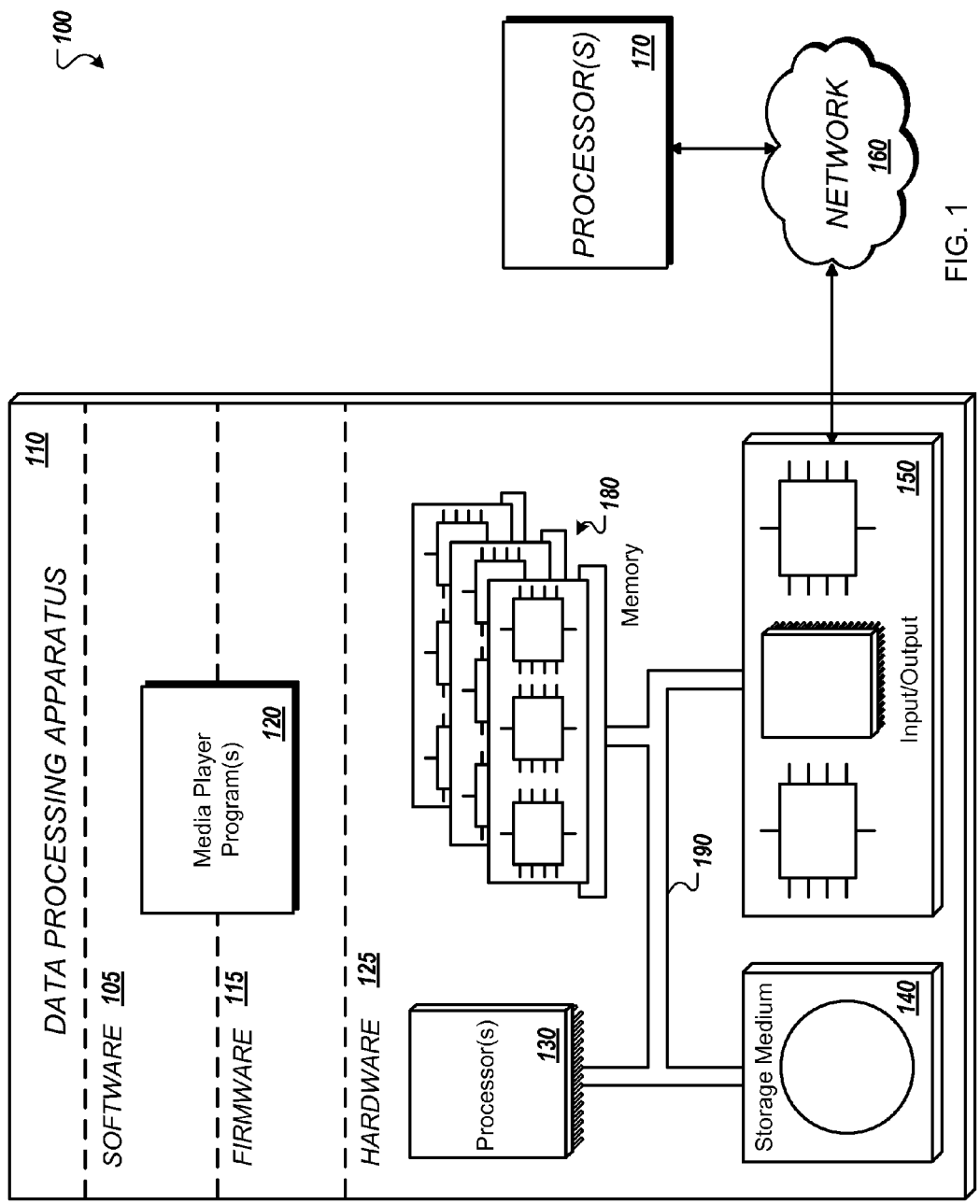
FIG. 1 is a block diagram showing an example computer system including one or more media player programs.

FIG. 1 is a block diagram showing an example computer system 100 including one or more media player programs 120. A data processing apparatus 110 can include hardware 125, firmware 115 and one or more software programs 105, including the media player program(s) 120. The media player program(s) 120 operate in conjunction with the data processing apparatus 110 to effect various operations described in this specification. The media player program(s) 120, in combination with the various hardware 125, firmware 115, and software 105 components of the data processing apparatus 110, represent one or more structural components in the system 100, in which the algorithms described herein can be embodied.

The media player program(s) 120 can be one or more applications for processing and outputting media content (e.g., audio, video, graphical, and/or textual data) to one or more output devices such as a display device and one or more speakers. An application refers to a computer program that the user perceives as a distinct computer tool used for a defined purpose. An application can be built entirely into an operating system or other operating environment, or it can have different components in different locations (e.g., a remote server). The media player program(s) 120 can include or interface with other software. The media player program(s) 120 can include a stand alone media player program, a media player program that relies on a runtime environment to operate (e.g., a JAVA® virtual machine or an Adobe AIR® runtime environment), or multiple different media player programs, which can be stand alone or runtime environment-based.

Interface software can also be included that operates over a network to interface with other processor(s), such as in a computer used by a digital content provider. For example, the media player program(s) 120 can include software methods for sending information to another computer accessible over the Internet for aggregation and analysis of media viewing statistics.

The hardware level 125 of the data processing apparatus 110 includes one or more processors 130, a memory 180, and at least one computer-readable medium 140 (e.g., random access memory, storage device, etc.). The hardware level 125 can also include one or more input/output devices 150, including one or more user interface devices.

Each of the components 130, 140, 150, and 180 are interconnected using a system bus 190. The processor(s) 130 can process instructions for execution within the system 100. In some implementations, one or more single-threaded processors can be included within the processor(s) 130. In other implementations, one or more multi-threaded processors can be included within the processor(s) 130. In some implementations, the processor(s) 130 can process instructions stored in the memory 180, or on the storage device 140, to display graphical information for a user interface on one of the input/output devices 150.

The memory 180 can be a computer-readable medium used to store information within the system 100 and can include a volatile memory unit, a non-volatile memory unit, or both. The storage device 140 can provide mass storage for the system 100. The storage device 140 can include a floppy disk device, a hard disk device, an optical disk device, or a tape device.

The input/output devices 150 provide input/output operations for the system 100. The input/output devices 150 can include a keyboard, mouse, stylus or pointing device, a display unit for displaying graphical user interfaces, a modem or other networking hardware/firmware, or any combination thereof to name a few examples.

The subject matter described in this specification can also be used in conjunction with other input/output devices, such as a printer or scanner. An input/output device can be used to connect to a network 160, and can furthermore connect to one or more processors 170 via the network 160 (e.g., the Internet).

Therefore, a user of the media player program(s) 120 does not need to be local, and may be connecting in a wired or wireless fashion using an internet or intranet connection on a personal computer, personal digital assistant (PDA), smartphone (e.g., a cellular phone including an operating system and advanced computing capabilities), or using other suitable hardware and software at a remote location. For example, a user can access a web interface via the remote processor 170 in order to view media content. In any event, data can be transmitted over the network 160 to/from the data processing apparatus 110. Note that the data processing apparatus 110 can itself be considered a user interface device (e.g., when the media player program(s) 120 is delivered by processor(s) 170 as a web service).

The system 100 can be used to render media content that introduces code having instructions to be performed in coordination with the rendering. For example, the media content received by the media player program(s) 120 can include one or more embedded programs or references to programs available online. The introduced program(s), in some examples, can include action script (AS) or Shockwave Flash (SWF) code.

In some implementations, the introduced program(s) can allow the provider or distributor of the media content to collect information regarding the consumption of the media content. For example, the introduced program(s) can include processes for collecting information regarding the consumption of media content being rendered upon the media player program(s) 120 and providing the collected information to one or more devices connected to the network 160. The collected data, in some examples, can be aggregated and the aggregated statistics reviewed to provide user recommendations or contextual advertisement placement.

Figure 2:
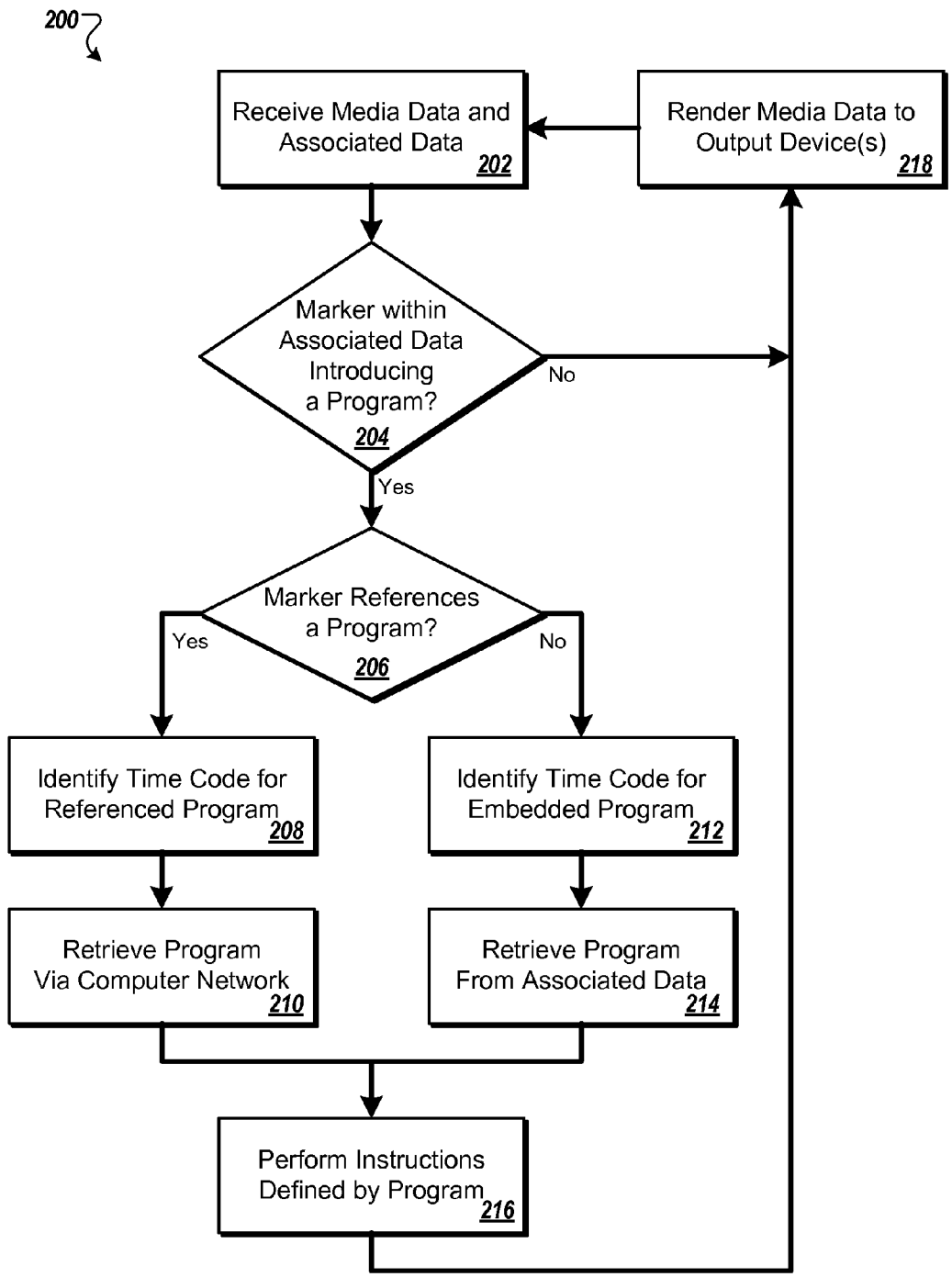
FIG. 2 is a flowchart showing an example process of rendering media content that introduces code having instructions to be performed in coordination with the rendering.

FIG. 2 is a flowchart showing an example process 200 of rendering media content that introduces code having instructions to be performed in coordination with the rendering. The process 200, for example, may be executed within a media player program such as the media player program 120 as described in relation to FIG. 1. In other implementations, process may be executed within a runtime environment on which a media player program is being executed to present the media content.

The process 200 begins with receiving media data, including both video data and audio data, and associated data (202). The media data and/or the associated data include incremental time codes (e.g., with respect to the beginning of the media content) referring to the relative execution of individual portions of the multimedia content (e.g., present this section of video at the same time as this section of audio). The media data and associated data, in some examples, can originate from a multimedia electronic document such as an MP4 (MPEG-4, Moving Picture Experts Group-4) document, Moving Picture Experts Group formatted document (e.g., MPEG-1, MPEG-2, or MPEG-4), Adobe Flash Video (FLV, F4V) or Video Coding Experts Group formatted document (e.g., H.263, H.264, etc.). In some implementations, the media data and associated data can be supplied to the process 200 as a stream of two or more unique media tracks. In other implementations, the media data and associated data can be included in single multiplexed stream of two or more unique media tracks (e.g., multiplexed by a media player or delivered from a networked content delivery service).

The associated data is reviewed to detect a marker identifying a program introduced by the associated data. A marker, in general terms, can be used to identify a function call. The function call, in some examples, can be targeted for acknowledgement by the media player or by the runtime environment. The media player and/or the runtime environment can execute upon recognized function calls, in some examples, to insert an advertisement into the execution of the multimedia content, to collect data regarding the execution of the multimedia content, or to deliver collected statistics to a network device. In some implementations, if the media player does not recognize a function call identified by a marker, the media player ignores the function call. A marker identifying a program introduced by the associated data, unlike a marker to a known function call, can either provide a cue regarding the beginning of a section of embedded program code or provide a cue to download a program from a networked computing device.

If the associated data does not include a marker identifying a program introduced by the associated data (204), the media data is rendered to the output device(s) (218). The current video is displayed, coordinating audio is played, and any other related media player functions can be executed—any text combined with the multimedia content may be displayed; any function calls cued by a marker may be executed, etc. The process 200 then returns to continuing to receive media data and associated data (202).

Otherwise, the marker identifying an introduced program can be analyzed. In some implementations, the process 200 can recognize program code which has been embedded directly within the associated media. In other implementations, the process 200 can recognize one or more references within the associated media to one or more programs which can be obtained through a network connection to a remote site (e.g., a server computer located in a different building or city). In further implementations, the process 200 can recognize both embedded program code and references to programs.

If the marker references a program (206), the time code for the referenced program can be identified (208). Each portion of the media content (e.g., video frame, audio frame, or function call) can be associated with a time code. Each time code provides a reference with respect to beginning of the media content (e.g., time zero of the video sequence). A marker which references a program can include a time code for the referenced program (e.g., at what point in the media stream the program is scheduled to be executed) plus a reference to a function which is accessible via a computer network.

Before the referenced function may be executed (e.g., at the scheduled reference time code), the program code for the referenced function can be retrieved via a computer network (210). In some examples, the program code may be downloaded to the computer system (e.g., the data processing apparatus 110 as described in FIG. 1) using a hyper text transfer protocol (HTTP) mechanism, a file transfer protocol (FTP) mechanism, a secure copy (SCP) mechanism, or a secure file transfer protocol (SFTP) mechanism. Moreover, the program code can begin execution before the code is completely received.

In some implementations, the program code may be retrieved from a trusted network source. For example, the program code may be downloaded via a secure network access by providing identification information (e.g., unique user identifier, computer identifier, media key, and/or media player identifier). In another example, a digital signature within the downloaded program code may be verified to ensure authenticity. To ensure the security of the computer system against the downloaded program code, in some implementations, the program code can be executed within a virtual resource allocation area such as a digital sandbox.

The downloaded program code, in some implementations, may be written in a bytecode format, which is abstracted from the type of media player or computer device that is executing the program code. In some examples, the program code may be coded in Java Virtual Machine (JVM) bytecode or in an Adobe Flash file format such as Shockwave Flash (SWF), Flash Video (FLV, F4V), or Action Script (AS). In other implementations, the program code may be written within a language recognized by the media player, the computer device operating system, and/or the runtime environment.

Instructions which are defined by the program are performed 216. Instructions can include, in some examples, information providing additional value to the media content such as metadata regarding one or more frames of the multimedia content (e.g., a particular automobile brand appears in video frame time t=25) or statistics gathering commands. The instructions, in some implementations, can include function calls to elements within the runtime environment, the media player, or a networked computing device. In some implementations, unrecognized function calls may be ignored.

At least a portion of the instructions defined by the program code can be executed at the time code designated by the program code reference marker. In some implementations, at least a portion of the program code can be executed during the same timeframe (e.g., time t=5) as the media data is being rendered to output device(s) (218).

In some implementations, the program code may initialize an independent timer. For example, the program code can execute based upon a timer which tracks the real time behavior of the user viewing the media content rather than the time code behavior of the media content as it is rendered by the media player. In this way, for example, the behavior of the viewer may be analyzed (e.g., consumption activities monitored, etc.). In some implementations, the program code may be triggered to execute two or more times throughout the execution of the media content. In some examples, the program code can be triggered at different times for different purposes such as initialization, data collection, statistics packaging, or statistics reporting.

If the marker does not reference a program (206), but rather indicates that a program is embedded along with the media data, the time code for the embedded program code can be identified (212), and the program can be retrieved from the associated data (214). The embedded program code, like the referenced program code, can be written in a platform-independent bytecode format or a programming code recognized by the operating system, the runtime environment, or the media player. The embedded program code can be included within one or more packets of the associated data. In some implementations, the entire program code is loaded into memory.

Upon retrieval of the program, the instructions defined by the program can be performed (216). For example, at least a portion of the instructions of the program code can be executed at the time identified by the time code while the media data is being rendered to the output device(s) (218). To ensure the security of the processing apparatus, in some implementations, the instructions can be executed within a security sandbox. In other implementations, a digital signature within the embedded content can be verified before the instructions defined by the program are performed. Upon completion of the activities corresponding to the current time code, the process 200 may return to receiving media data and associated data (202).

In some implementations, the introduced program(s) may be retrieved in advance (e.g., prefetch) and cached within the data processing apparatus. In this way, the program code may be (optionally) validated and loaded in time to be coordinated with the same time code as the media data being rendered.

Figure 3:
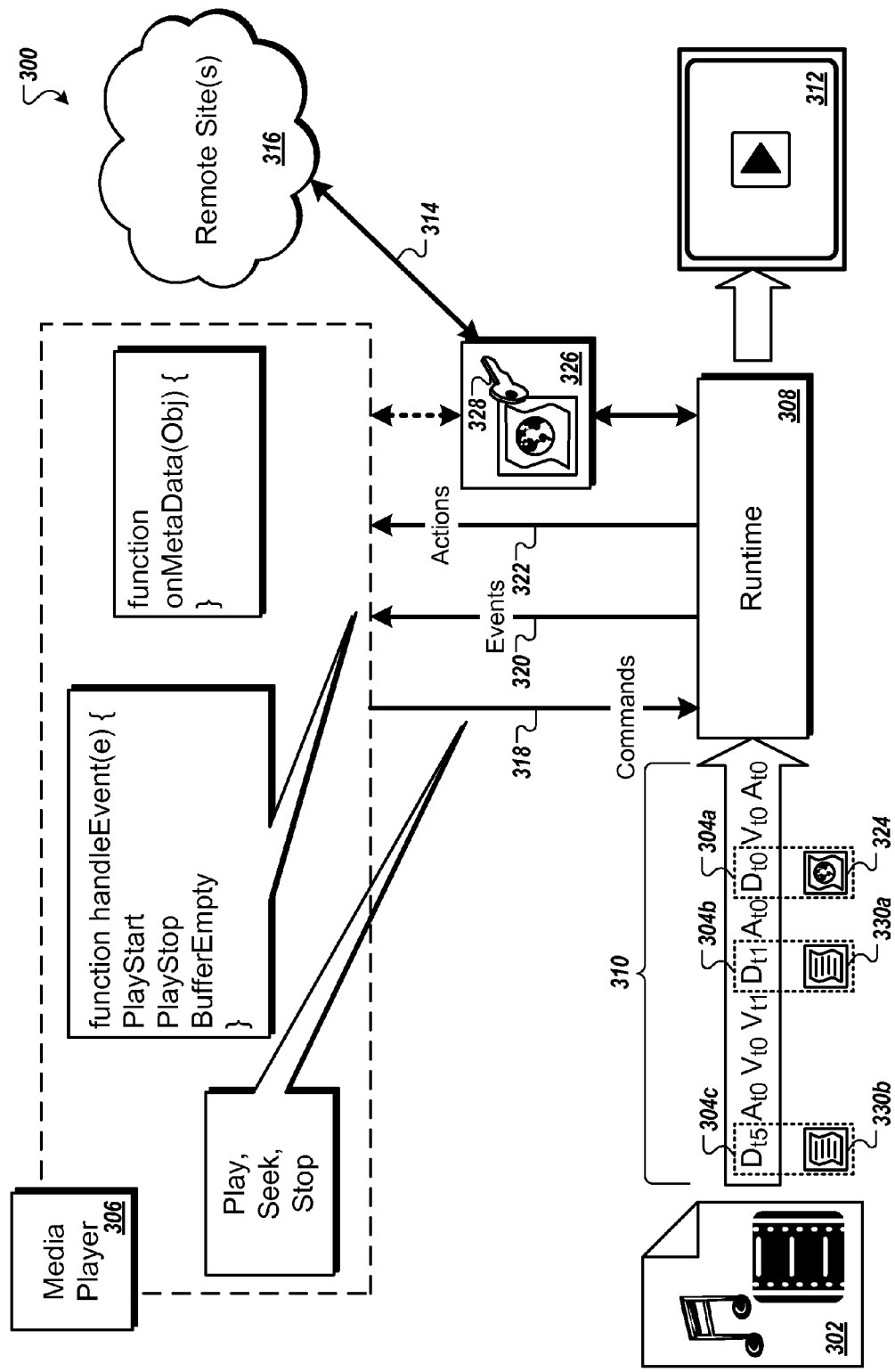
FIG. 3 is a block diagram showing an example process of rendering media content and performing instructions in coordination therewith.

FIG. 3 is a block diagram showing an example process 300 of rendering media content 302 and performing instructions 304 in coordination therewith. The process 300 involves a media player 306 that operates using a runtime environment 308 to render a multiplexed multimedia stream 310 of audio, video, and data content upon one or more output devices including a display 312. The process 300 additionally uses a network connection 314 to one or more remote sites 316. The process 300, for example, can be used to execute referenced program code and/or embedded program code within the media content 302.

When a user interacts with the media player 306 to view the media content 302, the media player 306 issues a series of commands 318 (e.g., play, seek, or stop) to the runtime environment 308. The runtime environment 308 (e.g., a Flash® runtime or an AIR® runtime environment provided by Adobe Systems Incorporated of San Jose, Calif.) receives the multimedia stream 310 of audio, video, and data content derived from the media content 302 (e.g., MP4, FLV, MPEG-2, or other multimedia content format) which is being rendered by the media player 306. The runtime environment 308 issues events 320 and actions 322 associated with the multimedia stream 310 to the media player 306. A first data packet 304a within the multimedia stream 310 includes a reference to a program 324. The runtime environment 308 communicates information 326 regarding the reference to the program 324 to the remote site(s) 316 over the network connection 314. In some implementations, the information 326 may include a key 328 which identifies the media content 302, the runtime environment 308, the media player 306, the processing apparatus, and/or the user of the processing apparatus to the remote site(s) 316. The remote site(s) 316, in some examples, can include multimedia servers within a content delivery network (CDN), a content provider network, or an Internet service provider network (ISP). For example, the remote site(s) 316 may include one or more data aggregation servers for aggregating data (statistics) regarding the multimedia content 302.

The information 326 may optionally be communicated to the media player 306. For example, the media player 306 may accept the key 328 or contribute identifying information to the key 328.

The runtime environment 308 downloads the program code referenced by the reference to the program 324 from the remote site(s) 316. During the course of execution of the program code, the runtime environment 308 and/or the media player 306 can provide additional information 326 to the remote site(s) 316 such as, for example, data collected by the runtime environment 308 and/or the media player 306 regarding the viewing of the media content 302. In some implementations, the program code may be downloaded from a different remote site 316 than the site to which the collected data is uploaded. For example, the program code can be downloaded from a media server site, while the collected data can be uploaded to a data aggregation server site. In other implementations, the program code download and the data upload can be communicated with a single remote site (e.g., a particular server computer, server cluster or server farm).

In addition to the reference to the program 324, the multimedia stream 310 includes a first embedded program 330a within a second data packet 304b and a second embedded program 330b within a third data packet 304c. The first embedded program 330a and/or the second embedded program 330b, in some implementations, can include function calls which instruct the runtime environment 308 and/or the media player 306 to communicate information with the remote site(s) 316. For example, the first embedded program 330a may include a function call requesting advertisement information from an advertisement server within the remote site(s) 316. In some implementations, the code within first embedded program 330a, the second embedded program 330b, and/or the reference to the program 324 can combine to perform stages of a process. The combined process, for example, can involve gathering and communicating information to a networked computer device to support server-side aggregation of statistics regarding the consumption of the media content 302.

During consumption of the media content 302, in some implementations, the program(s) 324, 330a, and/or 330b can receive events 320 and actions 322 from the runtime environment 308. For example, one or more of the events 320, such as pause, seek, start, or stop, may be used by the program 324 as context input. In another example, one or more of the actions 322 or events 324 may be used by the program 324 as a trigger to execute one or more commands (e.g., store data for use in statistics).

Figure 4:
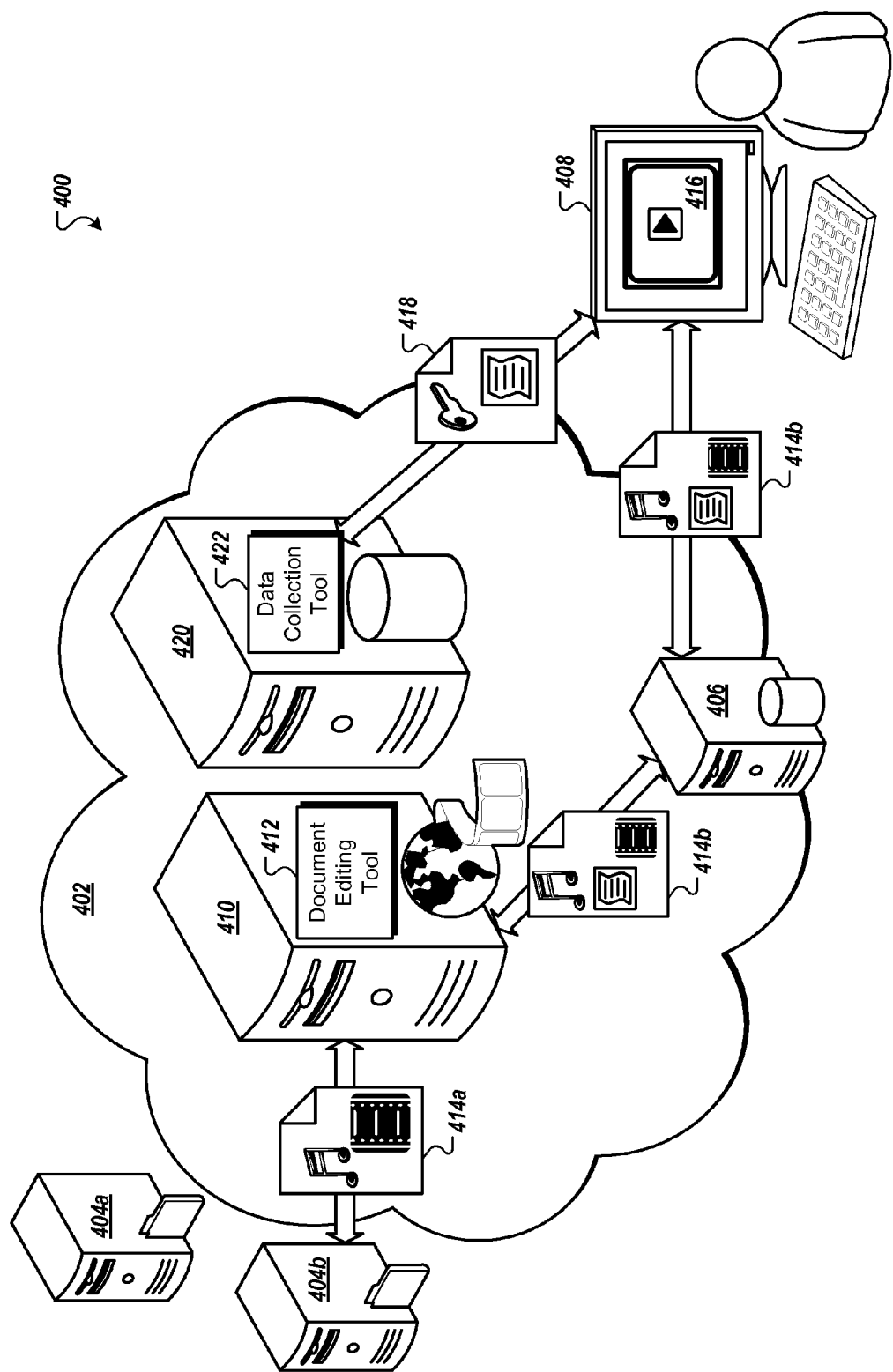
FIG. 4 is a block diagram showing another example computer system including one or more media player programs.

FIG. 4 is a block diagram showing another example computer system 400 including one or more media player programs 416. The computer system 400 includes a network 402 for sharing multimedia content. In some examples, the network 402 can represent the Internet, a content delivery network (CDN), a wide area network (WAN) or campus intranet, or a combination thereof.

Network 402, for example, can be used to distribute multimedia digital content through a network such as an internet service provider (ISP) network, a mobile device network, an Internet television (IPTV) broadcasting network, or other public or private digital network. The network 402 can receive content from content providers, for example from a first content provider server 404a or a second content provider server 404b. The content provider servers 404, in some examples, can be associated with film studios, record labels, television or cable TV providers, or advertisers.

The content which the content provider servers 404 deliver to the network 402 can include, in some examples, audio, visual, or multimedia digital content documents. Although the content provider servers 404 are illustrated as being outside the network 402, in some implementations one or more content provider servers 404 can be included within the network 402. For example, a cable TV provider can have an IPTV CDN including one or more content provider servers for generating TV content. Advertisements can be received from one or more advertisement content provider servers outside of the IPTV CDN and combined with the content generated by the IPTV CDN.

The network 402 can distribute content received from the content provider servers 404 to one or more content storage servers such as a content storage server system 406 (e.g., a server computer or server cluster). In some implementations, the network 402 can have any number of (physically distributed) content storage servers 406 to replicate multimedia content and to distribute this content to the user base of the network 402.

The user base of the network 402 can include any number or variety of user devices, such as, in some examples, personal computers, smartphones, personal digital assistants (PDAs), or notebook computers. The network 402, for example, includes a user connected via a personal computer (PC) user device 408. The user device 408 can connect to the network 402 in a wireless or wired manner. In some cases, the user device 408 can access the network 402 via an Internet browser. In some implementations, the user device 408 can be used for uploading content to the network 402 as well as receiving content from the network 402.

The network 402 includes a media server system 410 (e.g., a server computer or server cluster) which contains a document editing tool 412. The media server system 410, for example, can be accessed by an authorized user to modify digital content or to generate new digital content using the document editing tool 412. In some implementations, the document editing tool 412 can be used to modify digital content which the network 402 has received from one or more of the content provider servers 404. For example, the media server system 410 can receive a digital content document 414*a* directly from the content provider server 404*b* or retrieve a copy of the digital content document 414*a* which the network 402 received from the content provider server 404*b* and stored within the content storage server system 406. The document editing tool 412 can be used, for example, to introduce one or more programs into the associated data section of the digital content document 414*a*.

The document editing tool 412 produces a modified electronic document 414*b* which can be distributed directly to the user device 408 by the media server system 410 or copied to the storage server system 406. The electronic document 414*a*, in some implementations, can be retrieved from the content provider server 404*b* or the content storage server system 406, modified to introduce one or more programs, which can be referenced within the associated data or embedded as bytecode within the associated data, and the modified electronic document 414*b* can be delivered to the requesting user 408 in real time. In some implementations, the network 402 can include any number of media servers that modify and distribute digital content. For example, each content storage server within the network 402, such as the content storage server system 406, can include a copy of the document editing tool 412.

After the user 408 has received the modified electronic document 414*b*, the document 414*b* can be rendered by the media player 416. Programs introduced into the associated data of the electronic document 414*b*, for example, can be executed by the media player 416 or by a runtime environment operating beneath the media player 416.

If the modified electronic document 414*b* includes one or more references to introduced programs, the referenced program(s) 418 can be downloaded from a data aggregation server system 420 (e.g., a server computer or server cluster), the media server system 410, the content storage server system 406, or another device connected to the network 402.

In some implementations, instructions within an introduced program can include calls to communicate with the data aggregation server system 420. The media player 416 and/or a runtime environment operating beneath the media player 416, for example, can provide actions and events (e.g., regarding the performance of the media player 416, user inputs to the media player 416, etc.) to the introduced program. The introduced program can collect data during the rendering of the modified electronic document 414*b* based upon the received actions and events. The data, for example, can include information indicating one or more actions taken by a user during the rendering of the modified electronic document 414*b*. In some examples, the information can include identification of the portion of the media content displayed (e.g., the first 120 frames, the full video, etc.), identification of any portion(s) of the media content played more than once by the user, or identification of any portion(s) of the media content paused upon by the user. Each action or event collected as data, in some implementations, can be associated with a time stamp indicating when the data was collected. The collected data can, in further examples, include metadata associated with the media data rendered such as, in some examples, information identifying the media content, information identifying sections of the media content (e.g., one or more advertisements appended within a video content), quality of service (QOS) settings associated with the rendering of the media content, media player settings during rendering of the media content (e.g., full screen mode, subtitles, volume level, mute, etc.) or bookmarks associated with the media content.

The collected data can be provided to the data aggregation server system 420 from the user device 408 (e.g., at a scheduled basis, when the file(s) associated with the modified electronic document 414*b* are closed, upon one or more user actions such as stopping or pausing the rendering of the video content). The collected data can include one or more keys to identify the source of the data (e.g., identifying the modified electronic document 414*b*, the universal resource locator (URL) of the website accessing the modified electronic document 414*b*, the media player 416, the user device 408, the runtime environment, or the user). Other categories of data can be provided which may aide in aggregating the collected data to generate statistics. For example, the collected data can include time zone, regional, geographical, and/or date information.

Within the data aggregation server system 420, a data collection tool 422 can aggregate the collected data with other data related to the same or similar source (e.g., same video, same television series, same advertisement(s), etc.). In some implementations, the data collection tool 422 may also analyze statistics derived from the aggregated data.

The aggregated data and/or the derived statistics, in some implementations, can be provided to other devices within the network 402. For example, the data aggregation server system 420 can supply statistics to the content provider servers

404. The content provider servers 404 may use the statistics to refine media content such as the electronic document 414*a*.

Although the media server system 410, the content storage server system 406, and the data aggregation server system 420 are illustrated as individual network devices, in some implementations the functionality of each server system 410, 406, and/or 420 can be combined within one or two network devices. The network 402 can include any number of content storage servers, data aggregation servers, and/or media servers.

Figure 5:
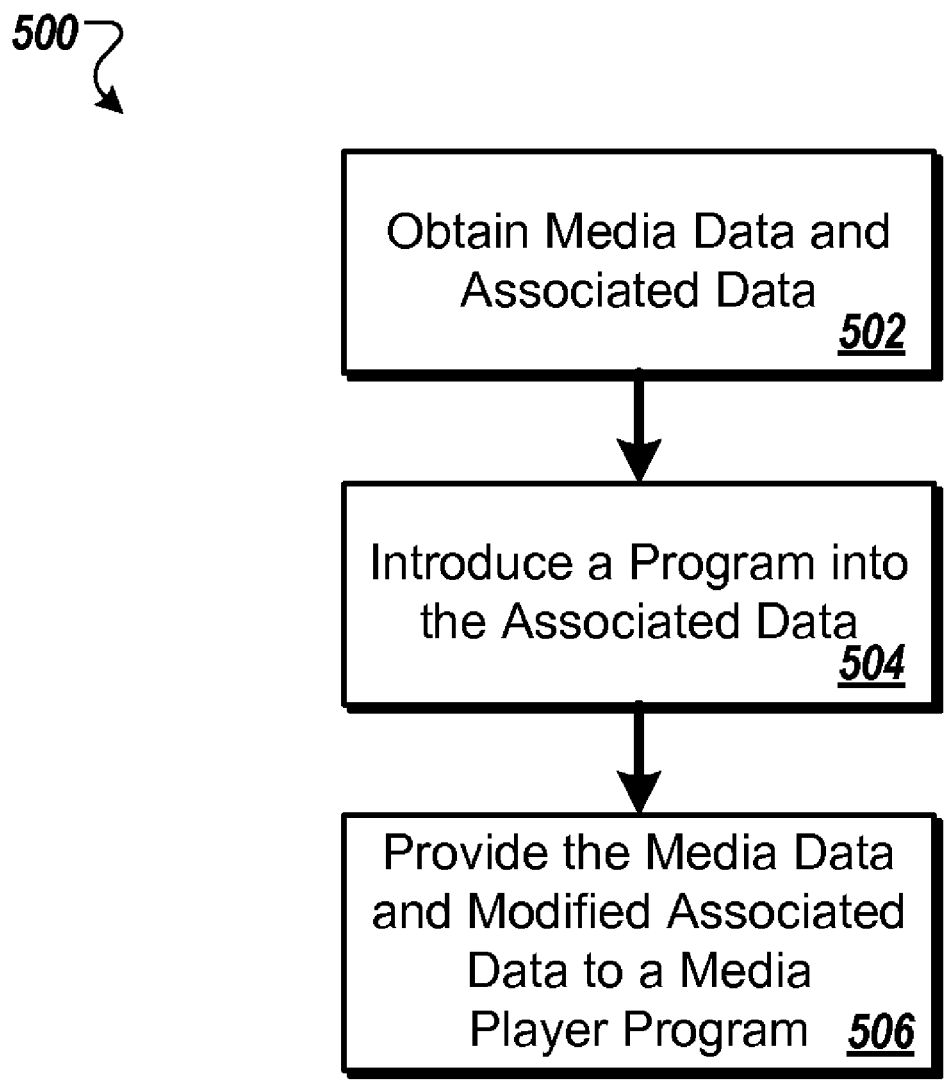
FIG. 5 is a flowchart showing an example process of generating media content that introduces code having instructions to be performed in coordination with rendering of the media content.

FIG. 5 is a flowchart showing an example process 500 of generating media content that introduces code having instructions to be performed in coordination with rendering of the media content. The code can be introduced into an electronic document which includes a media data portion, including both audio and video data, and an associated data portion. The process 500, for example, can be executed by the document editing tool 412 as described in FIG. 4. In another example, the process 500 may be executed by a multimedia creation application operating with a media player application within a computing device.

The process 500 begins with obtaining media data and associated data (502). The media data and associated data, in some implementations, can be received by the process 500 from an outside source (e.g., coordinating software application or digital information transfer process from a physically linked or networked device). In other implementations, the media data and associated data can be generated by the process 500 or by another process within the same application. For example, the process 500 may be part of a multimedia content generation software application, such as a media server application.

The media data and/or the associated data include incremental time codes (e.g., with respect to the beginning of the media content) referring to the relative execution of individual portions of the multimedia content. The media data and associated data, in some examples, can originate from a multimedia electronic document such as an MP4 (MPEG-4, Moving Picture Experts Group-4) document, Moving Picture Experts Group formatted document (e.g., MPEG-1, MPEG-2, or MPEG-4), Adobe Flash Video (FLV, F4V), or Video Coding Experts Group formatted document (e.g., H.263, H.264, etc.).

A program is introduced into the associated data (504). The associated data can be appended to add a marker identifying a program. The marker can either provide a cue regarding the beginning of a section of embedded program code or provide a cue to download a program from a networked computing device. In some implementations, the process 500 may introduce only embedded programs or it may introduce only referenced programs. In other implementations, the process 500 can introduce a mixture of embedded programs and referenced programs into the associated data.

If the program code is embedded, the program code, in some implementations, can be received by the process 500 from an outside source (e.g., coordinating software application or digital information transfer process). In other implementations, the program code can be generated by the process 500 or by another process within the same application.

The marker identifying the introduced program includes a time code. The time code can be used by a media player processing the associated data to time the execution of the program code relative to the start time of the media content (e.g., video). In some implementations, the time code designated for the marker is associated with a time code within the media data (e.g., video frame or audio frame). In other implementations, the time code designated for the marker is associated with a time code within the associated data (e.g., media player function call, runtime environment function call, etc.). The time code, in some examples, can be coordinated with an event (e.g., beginning of the media play, beginning of a new track of video media, etc.), action (e.g. a function call to display an advertisement within a video of a television program), or particular occurrence within the media (e.g., the visual display of Times Square in New York City).

The media data and modified associated data are provided to a media player program (506). The media player program, for example, may be installed upon a user device such as a personal computer, notebook computer, smartphone, or PDA. In some implementations, the media player is installed upon the same device as the device running the process 500. In other implementations, the media player is installed upon an external device such as a networked device.

A user can invoke the media player to render the media data to one or more output devices (e.g., play the video content and audio content through a display and one or more speakers). During the rendering of the media data at the time codes, the introduced program code can be executed in coordination with the rendering based on an associated time code for the program code. For example, the media player and/or a runtime environment operating beneath the media player can execute the process 200 as described in FIG. 2 to render the media data and perform the instructions defined by the introduced program code.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
  receiving media data and associated data, including time codes corresponding to both the media data and the associated data, the media data comprising at least one of video data and audio data;
  obtaining a program introduced by the associated data, the program having an associated time code from the time codes;
  rendering the media data to an output device in accordance with the time codes relative to a start time; and
  performing, by a hardware processor, one or more instructions defined by the program in coordination with the rendering based on the associated time code for the program.

2. The method of claim 1, where obtaining the program comprises:
  identifying a reference included within the associated data and having the associated time code, the reference being to the program; and
  retrieving the program from a different computer network domain via a computer network connection.

3. The method of claim 1, where obtaining the program comprises:
  identifying the program as included within the associated data and having the associated time code; and
  retrieving the program from the associated data;
  wherein receiving the media data and the associated data comprises receiving a multi-media stream comprising the media data and the associated data, with the program embedded in the multi-media stream.

4. The method of claim 1, where performing the one or more instructions defined by the program comprises communicating information indicating one or more actions taken by a user in connection with the media data being rendered.

5. The method of claim 4, wherein the receiving, the obtaining, the rendering and the performing are done by a runtime environment in which a media player application operates, the method comprising:
  receiving commands from the media player application; and
  sending events to the media player application, including an event that communicates a key to the media player application to support server side aggregation of the information communicated by the runtime environment with additional information communicated by the media player application.

6. The method of claim 1, where performing the one or more instructions defined by the program comprises communicating metadata regarding the media data being rendered.

7. The method of claim 1, where the program comprises a first program having a first associated time code, the method comprising:
  obtaining a second program introduced by the associated data, the second program having a second associated time code from the time codes;
  obtaining a third program introduced by the associated data, the third program having a third associated time code from the time codes, and the first, second and third associated time codes each being different from each other;
  performing one or more instructions defined by the second program in coordination with the rendering based on the second associated time code for the second program; and
  performing one or more instructions defined by the third program in coordination with the rendering based on the third associated time code for the third program.

8. A non-transitory computer storage medium encoded with a computer program, the program comprising instructions that when executed by data processing apparatus cause the data processing apparatus to perform operations comprising:
  receiving media data and associated data, including time codes corresponding to both the media data and the associated data, the media data comprising at least one of video data and audio data;
  obtaining a program introduced by the associated data, the program having an associated time code from the time codes;
  rendering the media data to an output device in accordance with the time codes relative to a start time; and
  performing one or more instructions defined by the program in coordination with the rendering based on the associated time code for the program.

9. The computer storage medium of claim 8, where obtaining the program comprises:
  identifying a reference included within the associated data and having the associated time code, the reference being to the program; and
  retrieving the program from a different computer network domain via a computer network connection.

10. The computer storage medium of claim 8, where obtaining the program comprises:
  identifying the program as included within the associated data and having the associated time code; and
  retrieving the program from the associated data;
  wherein receiving the media data and the associated data comprises receiving a multi-media stream comprising the media data and the associated data, with the program embedded in the multi-media stream.

11. The computer storage medium of claim 8, where performing the one or more instructions defined by the program comprises communicating information indicating one or more actions taken by a user in connection with the media data being rendered.

12. The computer storage medium of claim 11, wherein the receiving, the obtaining, the rendering and the performing are done by a runtime environment in which a media player application operates, the operations comprising:
  receiving commands from the media player application; and
  sending events to the media player application, including an event that communicates a key to the media player application to support server side aggregation of the information communicated by the runtime environment with additional information communicated by the media player application.

13. The computer storage medium of claim 8, where performing the one or more instructions defined by the program comprises communicating metadata regarding the media data being rendered.

14. The computer storage medium of claim 8, where the program comprises a first program having a first associated time code, the operations comprising:
  obtaining a second program introduced by the associated data, the second program having a second associated time code from the time codes;

obtaining a third program introduced by the associated data, the third program having a third associated time code from the time codes, and the first, second and third associated time codes each being different from each other;

performing one or more instructions defined by the second program in coordination with the rendering based on the second associated time code for the second program; and performing one or more instructions defined by the third program in coordination with the rendering based on the third associated time code for the third program.

15. A system comprising:

a user device; and one or more computers operable to interact with the device and to perform operations comprising:

obtaining media data and associated data, including time codes corresponding to both the media data and the associated data, the media data comprising at least one of video data and audio data;

introducing a program in the associated data, the program having an associated time code from the time codes; and providing the media data and the associated data, with the program introduced therein, to one or more media player programs for rendering of the media data to an output device in accordance with the time codes relative to a start time and for performing one or more instructions defined by the program in coordination with the rendering based on the associated time code for the program.

16. The system of claim 15, wherein the one or more computers comprise a server operable to interact with the device through a data communication network, and the device is operable to interact with the server as a client.

17. The system of claim 16, wherein the device comprises a computing apparatus having a runtime environment in which a media player application operates.

18. The system of claim 15, where obtaining the program comprises:

identifying a reference included within the associated data and having the associated time code, the reference being to the program; and retrieving the program from a different computer network domain via a computer network connection.

19. The system of claim 15, where obtaining the program comprises:

identifying the program as included within the associated data and having the associated time code; and retrieving the program from the associated data;

wherein receiving the media data and the associated data comprises receiving a multi-media stream comprising the media data and the associated data, with the program embedded in the multi-media stream.

20. The system of claim 15, where performing the one or more instructions defined by the program comprises communicating information indicating one or more actions taken by a user in connection with the media data being rendered.

21. The system of claim 20, wherein the receiving, the obtaining, the rendering and the performing are done by a runtime environment in which a media player application operates, the operations comprising:

receiving commands from the media player application; and sending events to the media player application, including an event that communicates a key to the media player application to support server side aggregation of the information communicated by the runtime environment with additional information communicated by the media player application.

22. The system of claim 15, where performing the one or more instructions defined by the program comprises communicating metadata regarding the media data being rendered.

23. The system of claim 15, where the program comprises a first program having a first associated time code, the operations comprising:

obtaining a second program introduced by the associated data, the second program having a second associated time code from the time codes;

obtaining a third program introduced by the associated data, the third program having a third associated time code from the time codes, and the first, second and third associated time codes each being different from each other;

performing one or more instructions defined by the second program in coordination with the rendering based on the second associated time code for the second program; and performing one or more instructions defined by the third program in coordination with the rendering based on the third associated time code for the third program.

* * * * *